United States Patent
Pudims et al.

(12) 
(10) Patent No.: US 6,274,809 B1
(45) Date of Patent: Aug. 14, 2001

(54) LARGE CAPACITY FLOOR BOX

(75) Inventors: Albert A. Pudims; Thomas J. Vigorito, both of Fairfield, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/301,617

(22) Filed: Apr. 29, 1999

(51) Int. Cl.[7] .................................................. H02G 3/08
(52) U.S. Cl. ............................... 174/48; 174/50; 174/53
(58) Field of Search ............................... 174/48, 53, 50; 52/220.2, 220.3

(56) References Cited

U.S. PATENT DOCUMENTS

| | | | |
|---|---|---|---|
| 2,611,500 | 9/1952 | Martin | 220/3.4 |
| 2,886,630 | 5/1959 | Gill | 174/57 |
| 2,996,566 | 8/1961 | Stas | 174/53 |
| 4,010,314 | 3/1977 | Kohaut | 174/48 |
| 4,338,484 | 7/1982 | Littrell | 174/48 |
| 4,536,612 | 8/1985 | Domigan | 174/48 |
| 4,591,656 | 5/1986 | Mohr | 174/48 |
| 4,593,507 | 6/1986 | Hartman | 52/221 |
| 4,800,237 | 1/1989 | Mohr | 174/48 |
| 5,008,491 | 4/1991 | Bowman | 174/48 |
| 5,101,078 * | 3/1992 | Yang | 174/48 |
| 5,257,487 * | 11/1993 | Bantz et al. | 174/48 X |
| 5,285,009 | 2/1994 | Bowman et al. | 174/48 |
| 5,350,884 * | 9/1994 | Littrell | 174/48 |
| 5,362,922 | 11/1994 | Whitehead | 174/48 |
| 5,466,886 | 11/1995 | Lengyel et al. | 174/48 |
| 5,468,908 | 11/1995 | Arthur et al. | 174/48 |
| 5,673,522 | 10/1997 | Schilham | 52/263 |
| 5,697,193 | 12/1997 | Forslund, III et al. | 52/220.5 |
| 5,796,037 | 8/1998 | Young et al. | 174/50 |
| 5,943,833 * | 8/1999 | Feldpausch et al. | 174/53 X |

OTHER PUBLICATIONS

Thomas & Betts Corporation, 665 Floor Box Installation & Activation Instructions, No Date.
Thomas & Betts Corporation, 665 Series Concealed Service Floor Box, 1992.
Walker, Installation Instructions for RFB4–CI—Cast Iron Floorbox, No Date.
Walker, Installation Instructions—Recessed Floor Box, Catalog No. RFB4, Jan. 20, 1994.
Walker Systems, Inc., Walkerbox Resource RFB Multiservice Shallow Steel Recessed Floor Box, 1994.
Hubbell Incorporated, Wiring Devices & Systems Kellems Wire Management Marine Wiring Products Catalog 2000, Rectangular Floor Box, p. K–24, 1995.
Hubbell Premise Wiring, Inc., Full Line Catalog #1100B, 3 Service Floor Box, pp. 128–129, No Date.

* cited by examiner

Primary Examiner—Dean A. Reichard
Assistant Examiner—Angel R. Estrada
(74) Attorney, Agent, or Firm—Jeffrey J. Howell; Alfred N. Goodman; Mark S. Bicks

(57) ABSTRACT

An electrical floor box having more than four outlets around a central access area. Each outlet has a wiring compartment formed from interlocking partitions with only the rear of each wiring compartment formed from the perimeter walls of the box. The partitions interlock through the use of a tab and slot system. A wire tunnel is positioned at the bottom of the central access area of the box and is formed from two pieces to enable easy removal of the wire tunnel and to facilitate access to the wires therein.

36 Claims, 8 Drawing Sheets

LARGE CAPACITY FLOOR BOX

BACKGROUND OF THE INVENTION

Electrical floor boxes are strategically placed in the floor to provide outlets for electricity and communication. Typical electrical floor boxes have either two or four outlets around a rectangular or square center access cavity. However, the increasing demand for electrical and communication outlets requires greater access to electrical and communication outlets then previously supplied. Thus, prior art floor boxes are becoming insufficient in supplying the quantity of outlets desired. Additionally, prior art electrical floor boxes commonly have wiring compartments formed from exterior walls of the box inherently limiting the number of wiring compartments and outlets within a given box.

Also, electrical floor boxes commonly have a wire tunnel that provide a conduit for wires. During installation, and sometimes after installation, it is necessary to access wires within the wire tunnel. However, prior art wire tunnels are generally difficult to remove. Thus, prior art wire tunnels make it difficult to access the wires therein.

Examples of prior art electrical boxes are disclosed in the following U.S. Pat. No. : 2,611,500 to Martin; U.S. Pat. No. 5,285,009 to Bowman et al.; U.S. Pat. No. 5,362,522 to Whitehead; U.S. Pat. No. 5,468,908 to Arthur et al.; U.S. Pat. No. 5,673,522 to Schilham U.S. Pat. No. 5,697,193 to Forslund, III et al.; and U.S. Pat. No. 5,796,037 to Young et al.

Thus, there is a continuing need to provide electrical boxes having a large quantity of electrical and communication outlets. Additionally, there is a continuing need to provide electrical boxes that are easily assembled and permit easy access to the wires and other elements contained therein. This invention addresses these needs in the art as well as other needs, which will become apparent to those skilled in the art once given this disclosure.

SUMMARY OF THE INVENTION

One object of the present invention is to provide an improved electrical floor box.

Another object of the invention is to provide an electrical box providing an increased quantity of electrical and communication outlets.

Still another object of the invention is to provide an electrical box that is easily assembled.

A further object of the invention is to provide an electrical box that provides easy access to the wiring and other elements contained within the box.

The foregoing objects are basically attained by providing an electrical box comprising a base having a support and a perimeter wall, the perimeter wall being coupled to the support and extending away from the support; a plurality of partitions forming first, second, third, fourth, and fifth compartments, each of the plurality of partitions being directly connected to the perimeter wall and the support, and each the compartment being separated from each of the other of the compartments by at least one of the plurality of partitions; and a cover positioned over the base.

The foregoing objects are also attained by providing an electrical box comprising: a base having a support and a perimeter wall coupled to and extending completely around the support and completely encircling a central cavity; and first and second partitions connected to the base and positioned within the central cavity, the first and second partitions and the perimeter wall forming first and second compartments, the first partition having a first slot and the second partition having a first tab removably positioned within the first slot.

The foregoing objects are further attained by providing an electrical box comprising: a base having a support and a perimeter wall coupled to and extending away from the support; first and second compartments formed within the base; and a tunnel member positioned on the support and having first and second tunnel portions, each of the tunnel portions being removably replaceable from the base and having a platform spaced from the support forming a tunnel cavity, at least one of the tunnel cavities forming a first passageway from the first compartment to the second compartment, and the first tunnel portion having a first access element for removal of the first tunnel portion from the base.

The foregoing objects are further attained by providing a method of forming an electrical box, comprising the steps of: providing a base having a support and a perimeter wall coupled to and extending away from the support; attaching a first partition to the base; attaching a second partition to the first partition and to the base with the first and second partitions forming first and second compartments and each of the first and second partitions being directly connected to the perimeter wall and the support, and each of the first and second compartment being separated from the other of the first and second compartments by one of the first and second partitions; and placing a cover over the first and second partitions to secure the first and second partitions to the base cover.

The foregoing objects are further attained by providing a method of accessing wires in an electrical box, comprising the steps of: providing a base having a support and a perimeter wall coupled to and extending away from the support; providing the base with a tunnel member having first and second tunnel portions, the first tunnel portion being separate from the second tunnel portion, each the tunnel portion having a platform spaced from the support forming a tunnel cavity, and the first tunnel portion having an access element for removal of the first tunnel portion; providing the base with first and second compartments facing the tunnel member, and the tunnel cavity forming a passage way from the first compartment to the second compartment; providing a faceplate covering each of the first and second compartments; removing the faceplates; and removing one of the first and second tunnel portions by hand, without the use of a tool; and accessing the wires.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

Referring now to the attached drawings which form a part of this original disclosure.

FIG. 12 is a top, plan view of the base of the box of the invention similar to FIG. 7, but with the wire tunnel in position with electrical wires passing there through;

FIG. 16 is a bottom, perspective view of one of the pieces of the wiring tunnel of the invention similar to FIG. 15, but with knockout panels removed and with electrical wires passing there through.

DETAILED DESCRIPTION OF THE PREFERRED EMBODIMENTS

Figure 1:
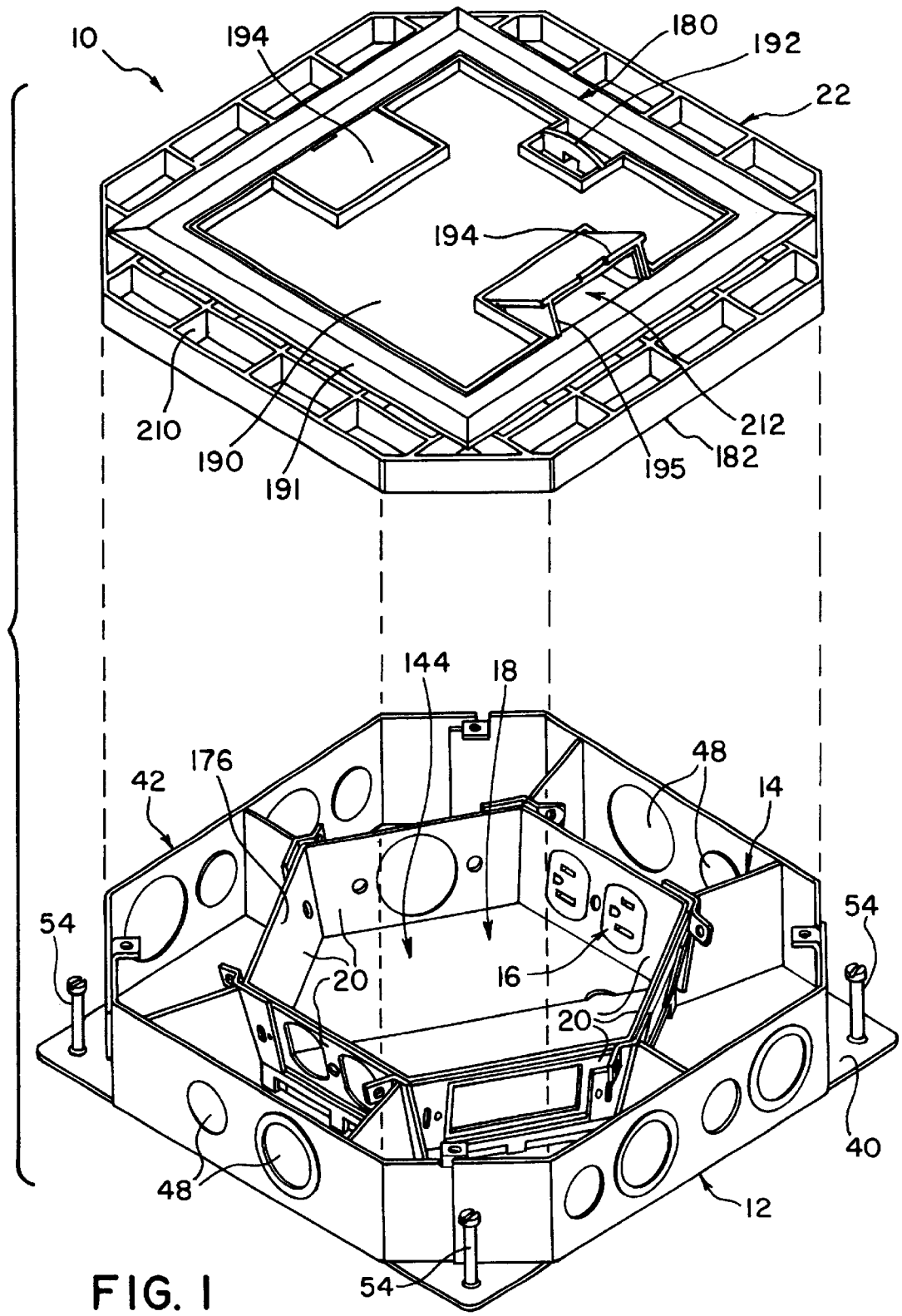
FIG. 1 is an explode, perspective view of the electrical box in accordance with the invention with the exterior cover and mounting cover separated from the base and with one sock attached to the base.
Figure 2:
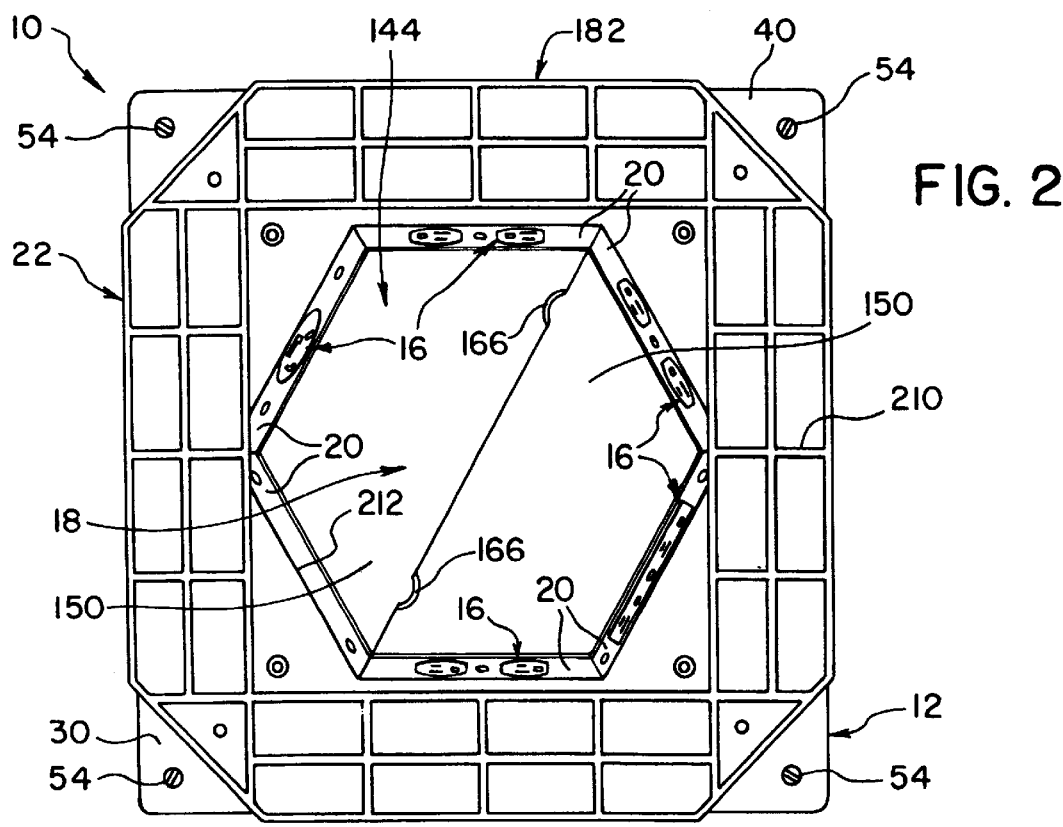
FIG. 2 is a top, plan view of the box of the invention with the exterior cover removed and with five sockets attached to the base.
Figure 3:
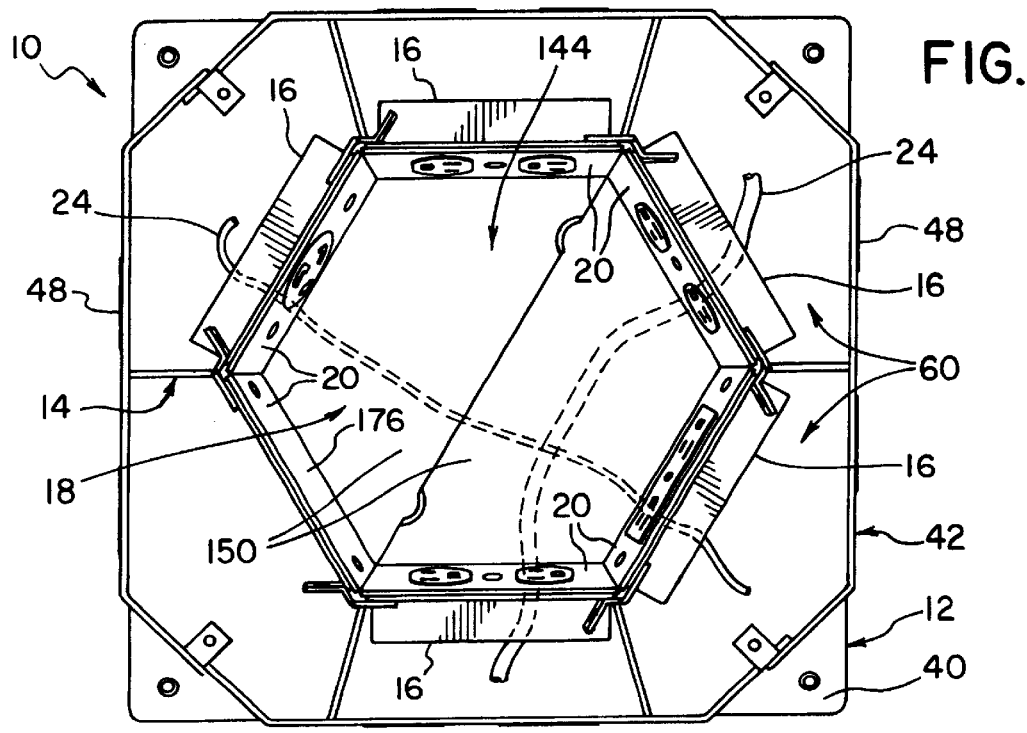
FIG. 3 is a top, plan view of the box of the invention similar to FIG. 2, but with the exterior cover and mounting cover removed and with five sockets attached to the base.

As seen in FIGS. 1–3, electrical junction box 10 in accordance with the invention includes a base 12, partitions 14, outlets 16, a wire tunnel member 18, faceplates 20, a cover assembly 22, and electrical wires 24. Box 10 is a floor junction box preferably intended for use in concrete floors. Basically, in use, base 12 is preferably embedded in concrete with outlets 16 being accessible to users through cover assembly 22, the top of which is generally level with the top of the floor. The manner of installing junction boxes in concrete floors is well known in the art and will not be discussed in detail herein.

Base 12 has a bottom or support 40 surrounded by a perimeter wall 42. Both bottom 40 and wall 42 are preferably made from the same single piece of sheet metal, preferably, galvanized steel. Wall 42 has long wall sections 43 shown in drawings and short wall sections 45, all of which are all integral and unitary with base 12. Long wall sections 43 are folded relative to base 12 until they are approximately perpendicular to the plane 30 in which base 12 lies. Then, short sections 45 are bent inwards about axes that are generally perpendicular to the plane 30 of base 12 until each of the short sections 45 contact a respective, adjacent short section 45. The adjacent, contacting short sections 45 are then secured by welding or other typical methods. The end result is a generally square bottom 40 with eight sections of wall 42 completely encircling the inner area of bottom 40.

Figure 4:
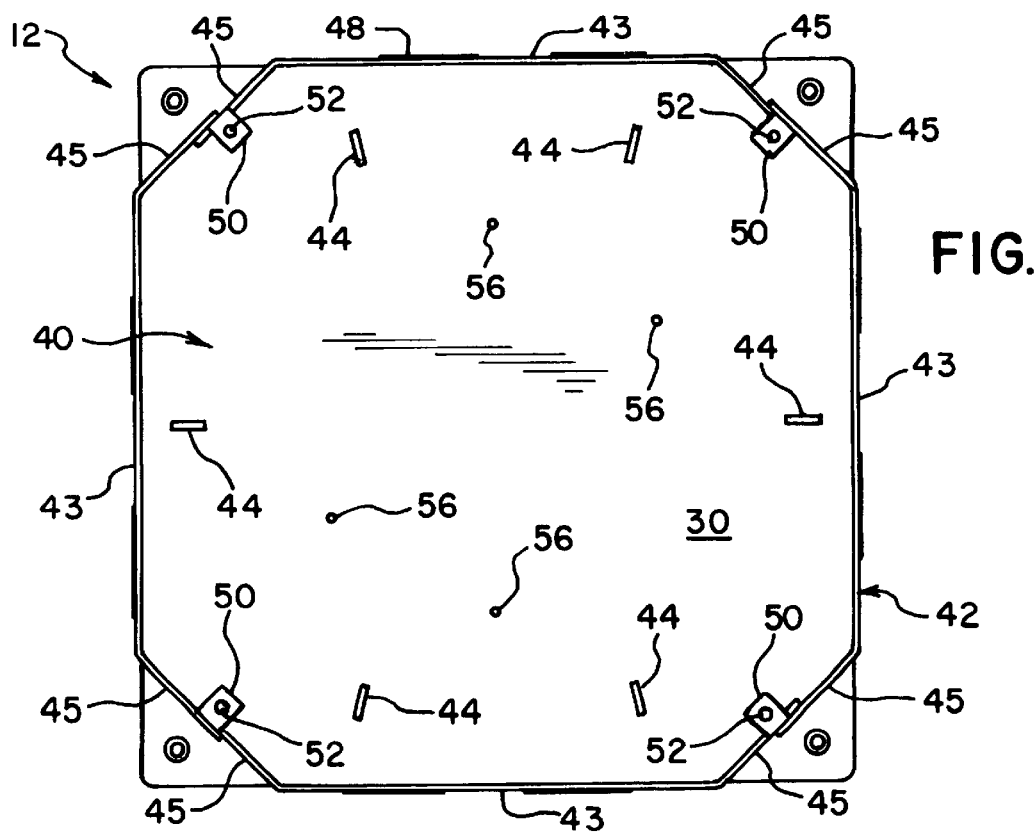
FIG. 4 is a top, plan view of the base of the box of the invention similar to FIG. 3, but with the base being empty.

As seen in FIG. 4, bottom 40 has a series of slots 44 and fastener holes 46, each extending completely through bottom 40. Slots 44 are for receiving elements extending from partitions 14 to properly locate and secure partitions 14 as discussed below. Fastener holes 46 provide openings for a fastener to extend through both a partition 14 and bottom 40 to further locate and secure partitions 14 to bottom 40. At each of its four corners, bottom 40 has a leveling screw 54 to aid in properly leveling base 12 and box 10 during installation of box 10 in the floor.

Each of the longer wall sections 43 has at least one and preferably two knockout panels 48 as known in the art for permitting a connection point for conduits and an entry point for wires or cables for ultimate connection to the outlets 16.

Additionally, one of the two shorter wall sections 45 for each pair of joined sections 45 has an integral, bent flange 50 with a fastener hole 52 extending completely through flange 50. Fastener holes 52 are preferably threaded and permit fasteners to securely fasten cover assembly 22 to base 12.

Base 12 can take other alternative forms. For example, base 12 can be made of material other than metal, such as plastic, can be made of multiple, separate parts, or can be formed in different shapes.

Partitions 14 are inserted into base 12 to form separate wire connection compartments 60. Preferably, six compartments 60 are formed. Each compartment 60 provides an isolated area for the location of a single outlet 16 and the wire or cable connections associated with that outlet 16. Partitions 14 are arranged so that each compartment 60 is formed by a portion of wall section 43 having at least one knockout panel 48. As seen in FIG. 1, each compartment 60 preferably has two knockouts 48 for wire access into the compartments 60.

Partitions 14, as illustrated most clearly in FIGS. 5–11, preferably include three shapes of partitions: a single-section partition 70, a double-section partition 72, and a triple-section partition 74. Each of the sections 70, 72, and 74 have similarities and differences that allow the sections 70, 72, and 74 to interlock with each other and with base 12 to securely form compartments 60 without the use of separate fasteners; such as, welding or other adhesives, or screws. The partitions 14 are each preferably made by being folded to their final shape from a single piece of metal, such as galvanized steel, although other materials can be used, such as plastic. Although three different partition sections are disclosed, fewer than three or more than three types of sections can be used. Also, the partition sections can take various configurations, possibly different from any of those disclosed herein, resulting in any number of wiring compartments. The exact configuration, orientation and number of partitions is merely one example of the numerous possibilities.

Each partition section 70, 72, and 74 has an inner side 80 that faces toward the center of base 12 when fully assembled. Inner side 80 is the ultimate attachment area of an outlet 16 and/or a faceplate 20. Each inner side 80 includes inclined supporting walls 82 with circular holes 84 and slots 86 for attaching outlets 16 and faceplates 20, a grounding flange 88 for a grounding screw hole 90, a fastener leg 94 having a hole 96, and wire openings 98. As seen in FIG. 3, the inner sides 80 form a generally hexagonal area and form six areas for attaching various outlets 16 to box 10. The hexagonal orientation of the inner sides 80 enables a relatively high number of outlets to be secured to a box 10 without exceeding an excessive overall dimension of the box 10.

When partitions 14 are in position in base 12, supporting walls 82 of inner sides 80 are inclined with respect to the upper flat surface of bottom 40 to allow for easier access to the outlets 16 that are ultimately attached to the various inner sides 80. As seen in FIG. 2, access to outlets 16 is achieved through the top of box 10, that is, through cover assembly 22. The inclination of walls 82 not only enables for an insertion angle into each outlet 16 that is inclined with respect to the planar top surface of bottom 40, but the user can more easily see the outlet 16 attached to each wall 82. Each inner side 80 has two supporting walls 82, one on each side of an outlet opening 99. Each supporting wall 82 preferably has one circular hole 84 and one slot 86 for the attachment of either an outlet 16 or a faceplate 20. The manner of attachment is generally known in the art. The outlet 16 or faceplate 20 for attaching to each inner side has holes that align with either the pair of holes 84 or the pair of slots 86 and a fastener; such as a screw, is passed through the appropriate aligned openings. An outlet 16 occupies the opening 99.

Fastener leg 94 is centrally positioned but is bent to form an abutment portion 95, which lies flush with the top of bottom 40. Abutment portion 95 has a hole 96, which aligns with one of the fastener holes 46 in bottom 40. A fastener can be inserted through both the abutment portion 95 and the bottom 40 to further secure the respective partition 14 to the base 12. Additionally, fastener leg 94 enables the formation of wire openings 98. Openings 98 permit wire to travel through each partition 14 by forming an aperture between bottom 40 and each partition 14. Wire or cable 24 can then travel between the rear of an outlet 16 within a compartment 60 to the middle area of base 12 by proceeding into and through wire tunnel member 18 and entering other compartments 60.

Figure 11:
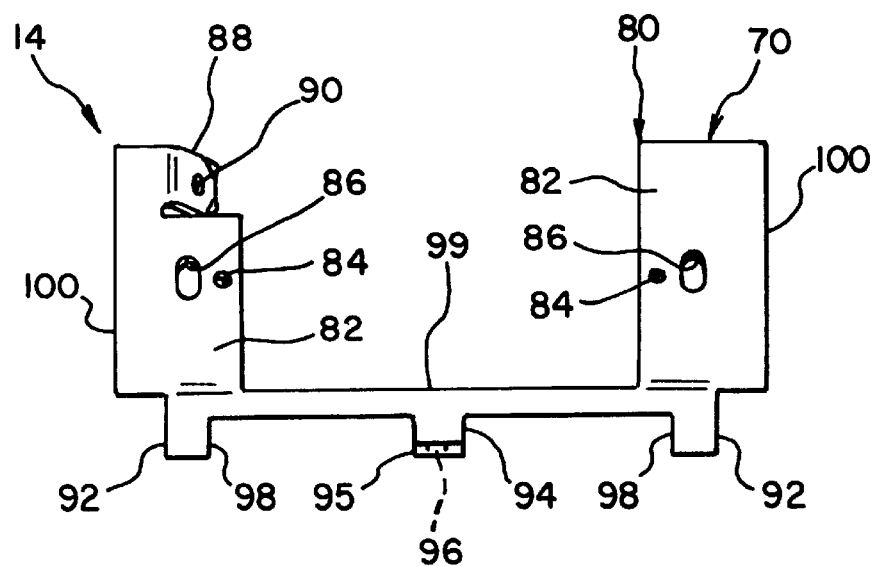
FIG. 11 is a front, elevational view of a third wiring compartment partition.

As best seen in FIG. 11, single-section 70 has two tabs 100 and two mounting legs 92 in addition to those elements that are common to all partitions 14. Each tab 100 is an extension of a supporting wall 82, and is sized for insertion into a mating slot of another partition as discussed below. Each mounting leg 92 extends from a supporting wall 82 and abuts bottom 40 in order to form openings 98.

Figure 10:
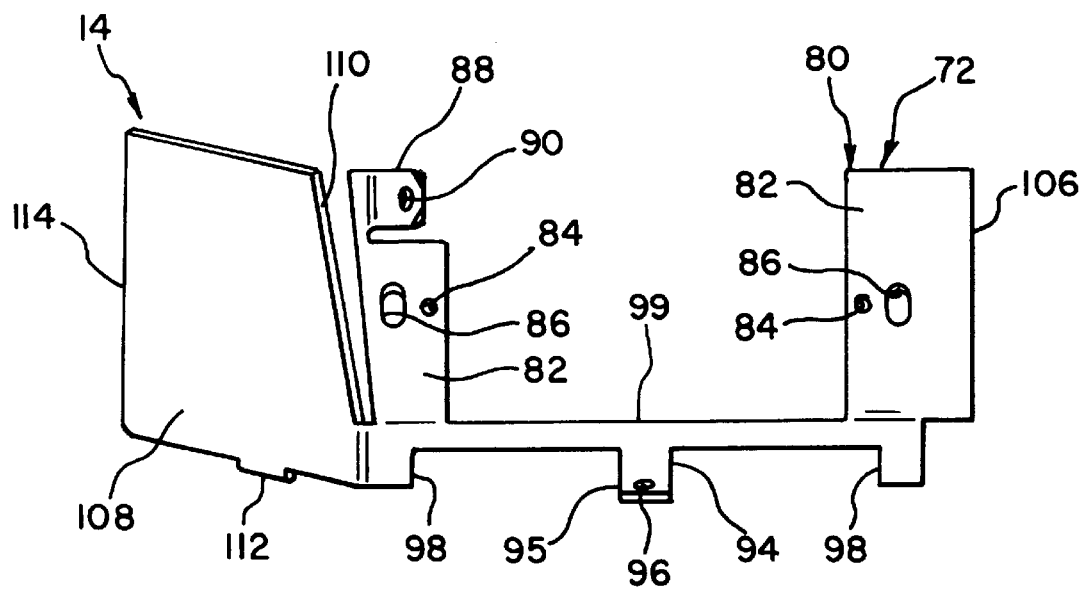
FIG. 10 is a front, elevational view of a second wiring compartment partition.

As best seen in FIG. 10, double-section 72 has one tab 106 and an angled wall 108 with a slot 110 and a bottom tab 112 in addition to those elements that are common to all partitions 14. Tab 106 is an extension of a supporting wall 82, and is sized for insertion into a mating slot of another partition as discussed below. Angled wall 108 is integral with the supporting wall 82 opposite to the one with tab 106 and is not inclined with respect to bottom 40 when installed in base 12 as is supporting wall 82. Instead, angled wall 108 is preferably formed to be generally perpendicular to bottom 40, when attached thereto. Bottom tab 112 is sized to be inserted into a mating slot 44 in bottom 40 for securing the section 72 to base 12 as all other tabs that are inserted into one of the slots 44. Slot 110 is slightly V-shaped and is sized to receive a mating tab attached to a supporting wall 82 from another partition 14, such as tab 100.

Figure 9:
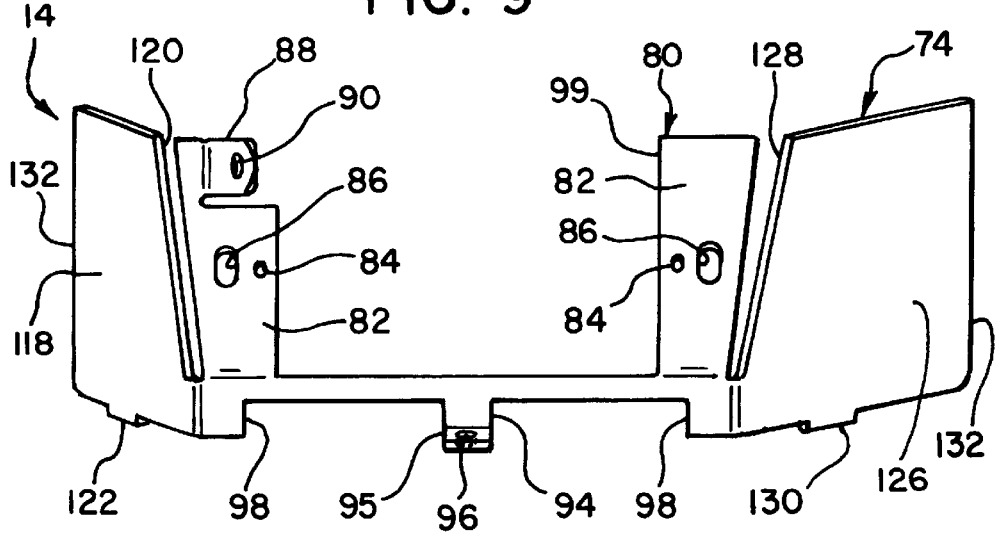
FIG. 9 is a front, elevational view of a first wiring compartment partition.

As best seen in FIG. 9, triple-section 74 has a first angled wall 118 with a slot 120 and a bottom tab 122 and a second angled wall 126 with a slot 128 and a bottom tab 130 in addition to those elements that are common to all partitions 14. First angled wall 118 is integral with the supporting wall 82 and is not inclined as supporting wall 82 when installed in base 12 as is supporting wall 82. Instead, angled wall 118 is formed to be generally perpendicular to bottom 40, when attached thereto. Bottom tab 122 is sized to be inserted into a mating slot 44 in bottom 40 for securing the section 74 to base 12 as all other tabs that are inserted into one of the slots 44. Slot 120 is slightly V-shaped and is sized to receive a mating tab attached to a supporting wall 82 from another partition 14, such as tab 106, similar to the other V-shaped slots in partitions 14. Second angled wall 126 is integral with the supporting wall 82 opposite to the first angled wall 126 and is not inclined as supporting wall 82 when installed in base 12 as is supporting wall 82. Instead, angled wall 126 is formed to be generally perpendicular to bottom 40, when attached thereto. Bottom tab 130 is sized to be inserted into a mating slot 44 in bottom 40 for securing the section 74 to base 12 as all other tabs that are inserted into one of the slots 44. Slot 128 is slightly V-shaped and is sized to receive a mating tab attached to a supporting wall 82 from another partition 14, such as tab 100, similar to the other V-shaped slots in partitions 14.

Figure 5:
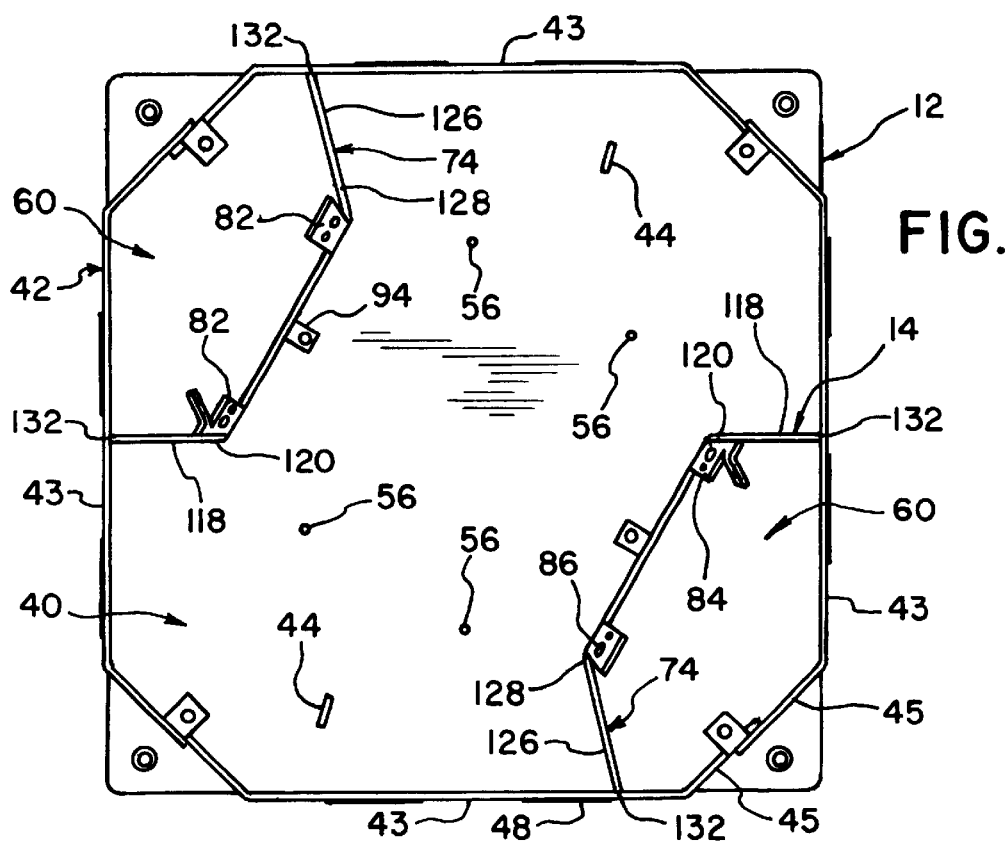
FIG. 5 is a top, plan view of the base of the box of the invention similar to FIG. 4, but with the base having two wiring compartment partitions inserted therein.

The assembly of partitions 14 is illustrated in FIGS. 5–8. As seen in FIG. 5, two triple-section partitions 74 are positioned on opposite sides of base 12 and form two, separate compartments 60. Each partition 74 is secured to bottom 40 by bottom tabs 122 and 130 being inserted into the appropriate slot 44 in bottom 40. Also, edges 132 of partitions 74 abut wall 42 to stabilize the partitions 74 and to form a complete separation between adjacent compartments 60.

Figure 6:
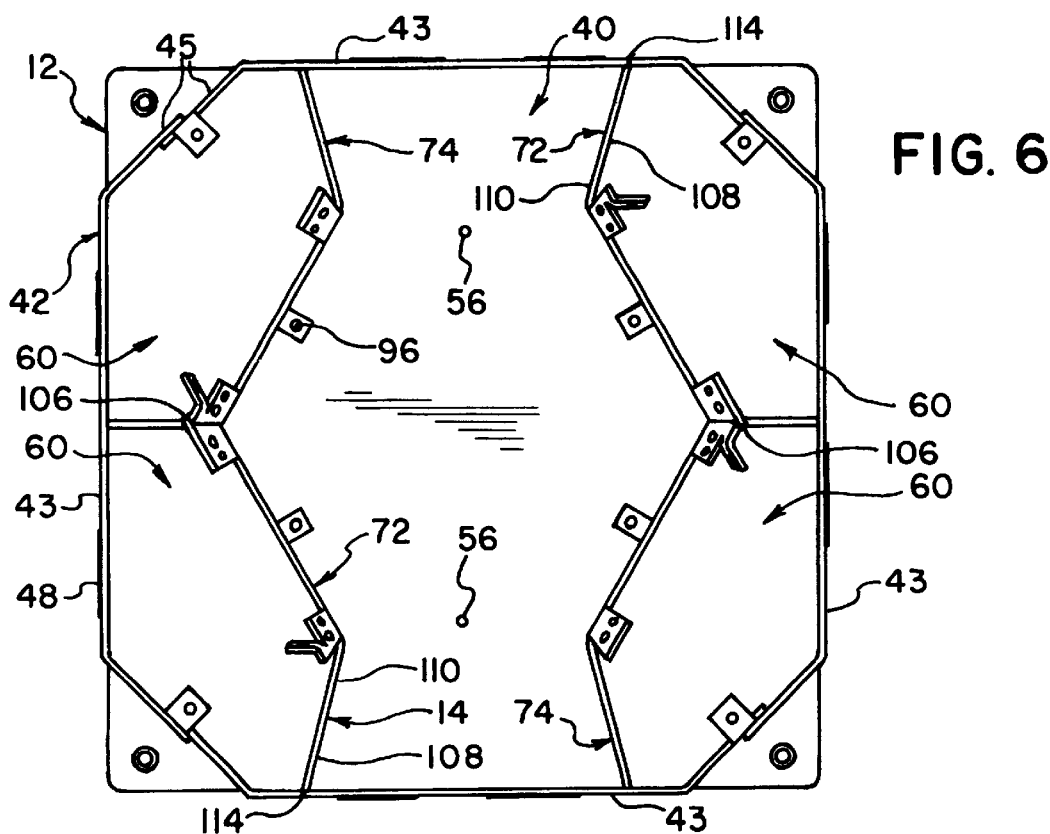
FIG. 6 is a top, plan view of the base of the box of the invention similar to FIG. 5, but with the base having four wiring compartment partitions inserted therein.

Then, as seen in FIG. 6, two double-section partitions 72 are positioned on opposite sides of base 12 to form two additional compartments 60 bringing the total number of compartments to four. The tab 106 of each double-section partition 72 is positioned within the slot 120 of the adjacent triple section partition 74. Each double-section partition 72 is secured to bottom 40 by bottom tab 112 being inserted into the mating slot 44 in bottom 40. Also, each edge 114 of the double-section partitions 74 abut wall 42 to stabilize the partitions 72 and to form a complete separation between adjacent compartments 60.

Figure 7:
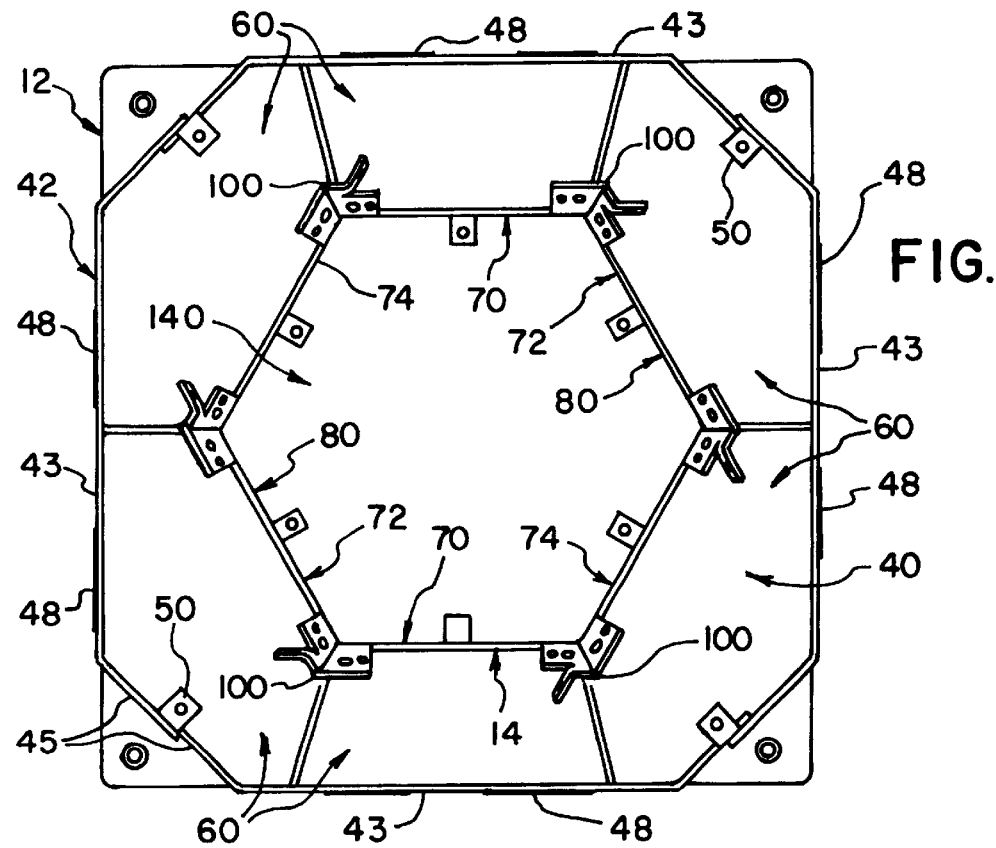
FIG. 7 is a top, plan view of the base of the box of the invention similar to FIG. 6, but with the base having six wiring compartment partitions inserted therein forming six wiring compartments.
Figure 8:
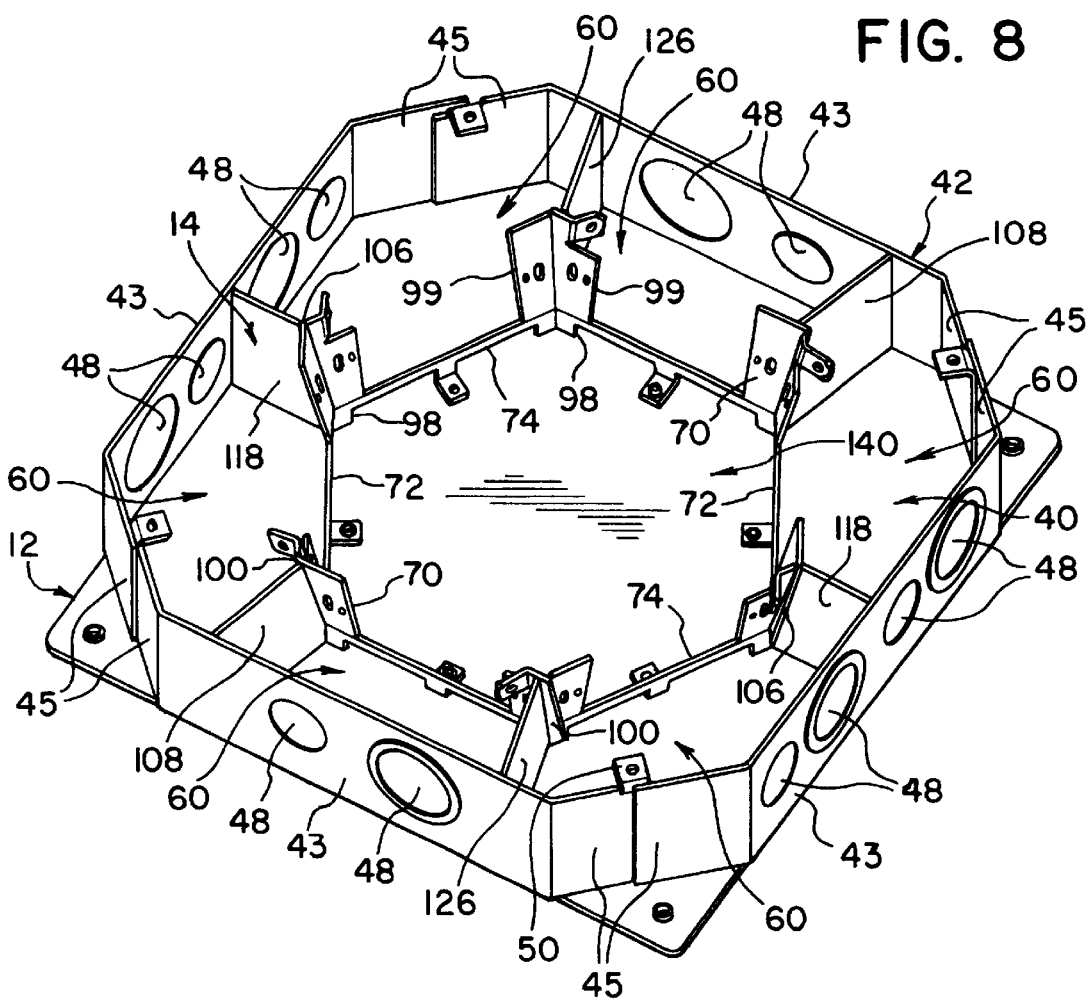
FIG. 8 is a perspective view of the base of the box of the invention, with the base having six wiring compartment partitions inserted therein forming six wiring compartments.

Next, as seen in FIG. 7, two single-section partitions 70 are positioned on opposite sides of base 12 to form two further compartments 60, bring the total number of compartments to six. One tab 100 of each single-section partition 70 is positioned within the slot 110 of the adjacent double section partition 72 and the other tab 100 of each single-section partition 70 is positioned within the slot 128 of the adjacent triple-section partition 74. As a possible final step, each partition 14 can be secured, if necessary, to bottom 40 by appropriate fasteners extending through holes 96 in abutment portions 95 and through bottom 40.

Figure 12:
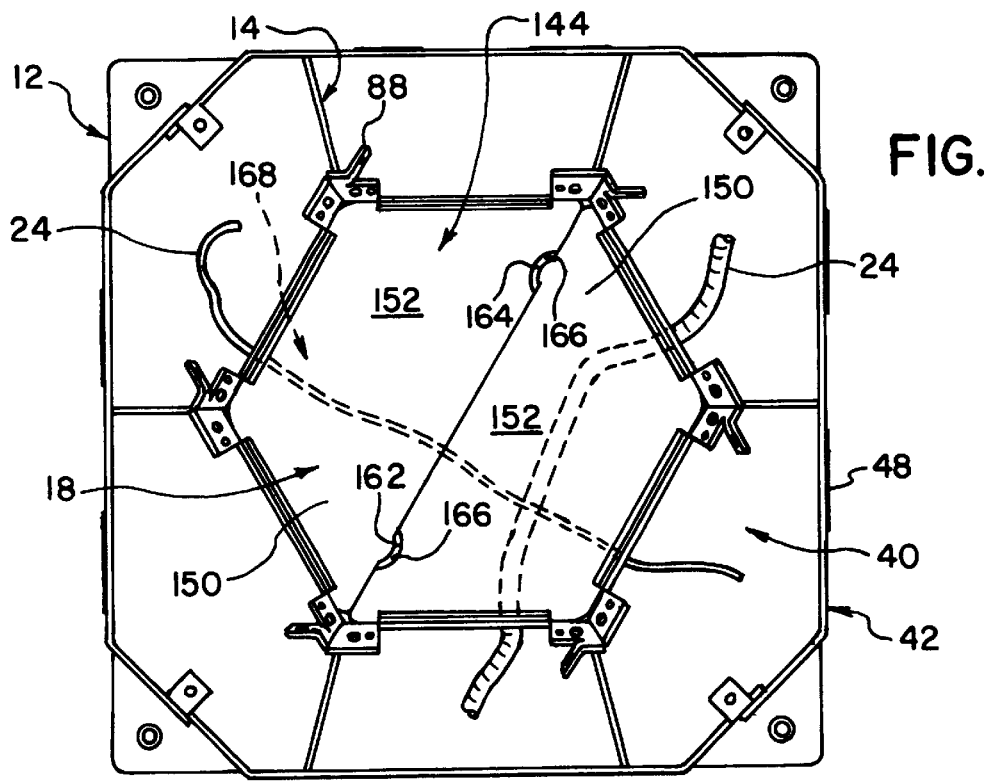

As best seen in FIG. 7, when partitions 14 are inserted into their appropriate positions, a generally hexagonal cavity 140 is formed by the inner sides 80 of each partition 14. Hexagonal cavity 140 receives wire tunnel member 18 as seen in FIG. 12. Wire tunnel member 18 permits wires to pass between compartments 60 while being insulated and separated from the access cavity 144, where outlets 16 are accessed for use through cover assembly 22. Wire tunnel member 18 also permits separation between data/communication lines and electrical lines.

As seen in FIGS. 12–16, wire tunnel member 18 is formed from two tunnel portions 150. Both tunnel portions 150 are identical, but have different orientation, one is orientated 180 degrees from the other. Thus, the description herein of one tunnel portion 150 will apply to both tunnel portions 150 forming wire tunnel member 18. Since both portions 150 are identical, savings can be realized in the manufacturing of a single part.

Tunnel portion 150 has a substantially planar platform 152 forming a four-sided shape, which is half of a hexagon.

Platform 152 is raised above bottom 40 by pillars 154, wall segments 156, and knockouts or breakaway walls 158, all of which extend from platform 152 in a substantially perpendicular manner. The removal of one or all knockouts 158 permits, in use, wires or cable 124 to be passed into the area between platform 152 and bottom 40. Knockouts 158 are connected to the remaining elements of tunnel portion 150 by weakened areas 160, which aid in the removal of knockouts 158.

If at least two knockouts 158 are removed, wire or cable 124 can pass between compartments 60 and a isolated passageway or tunnel 168 is formed. Any combination of knockouts 158 can be removed, if any at all, in order to satisfy the particular needs or desires of the user. It is possible to form to completely isolated tunnels 168 if a dividing wall 159 is maintained intact during use. Dividing wall 159 is formed from wall segments 156 and the knockout 158 positioned there between. When a dividing wall 159 is maintained in one or both tunnel portions 150, two isolated tunnels 168 are formed when the two tunnel portions are joined at illustrated, with abutting wall segments 156.

Figure 16:
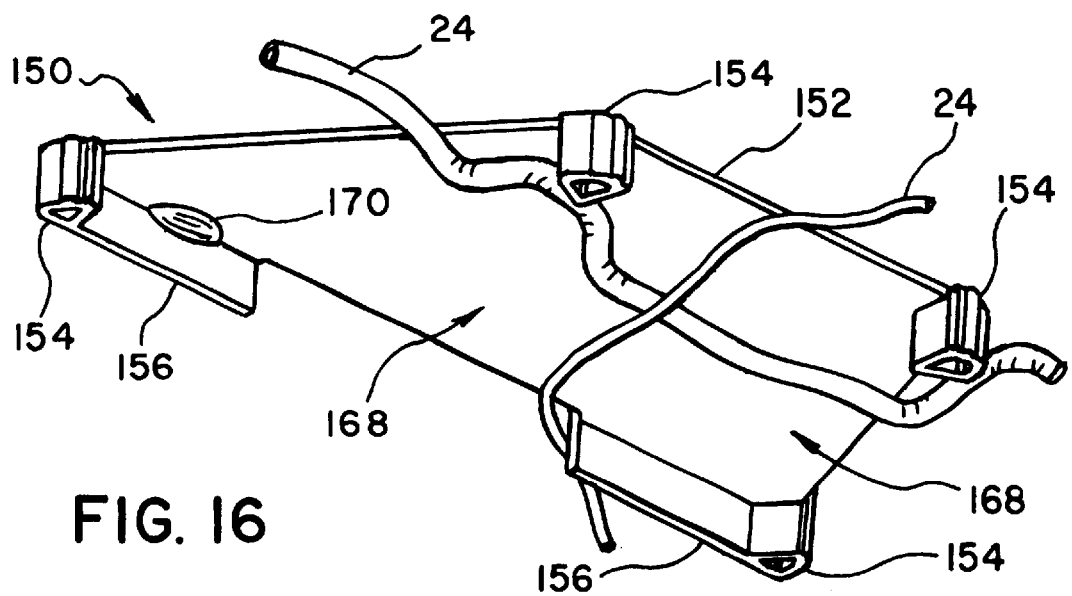

Platform 152 has a depression 162 and a protrusion 164 adjacent the dividing wall 159. Depression 162 is preferably smoothly shaped in the form of the inside of a hollow, spherical section. As seen in FIG. 16, the bottom of depression 170 extends below platform 152. Protrusion 164 has a top surface 163, which is coplanar with the top of platform 152, and a bottom surface 166, which has an inclined edge sized and shaped to mate with a depression 162 on another tunnel portion 150.

Figure 13:
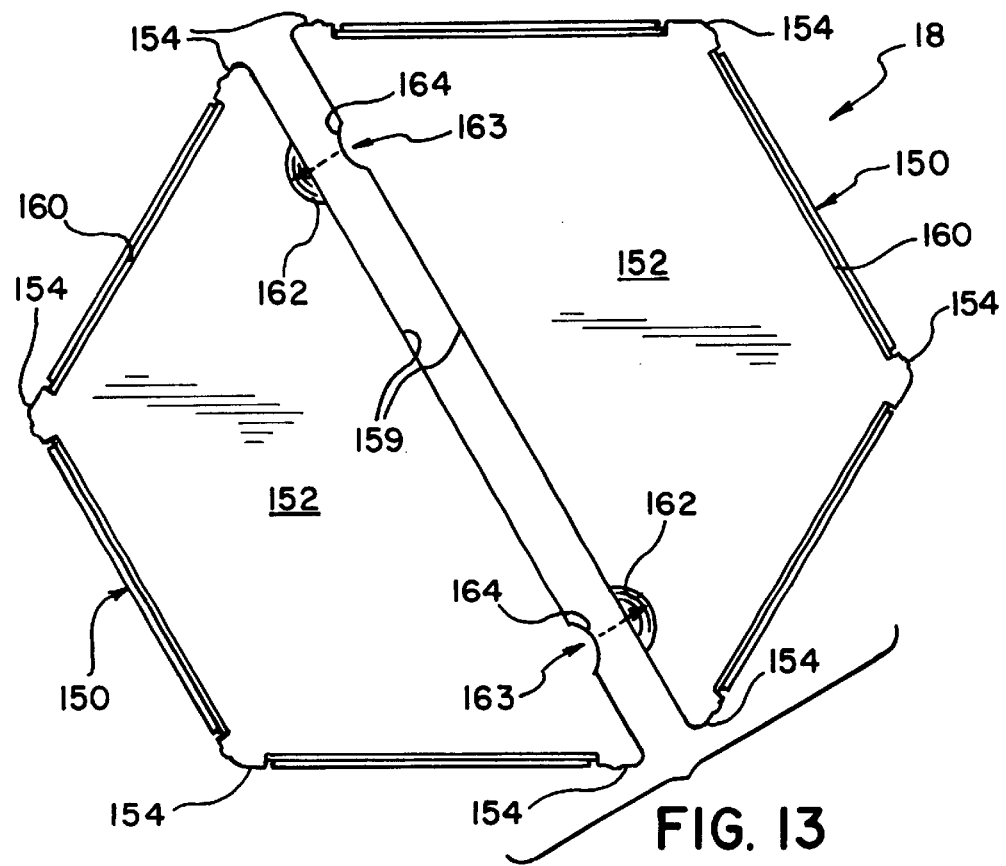
FIG. 13 is a top, plan view of the two-piece wiring tunnel in accordance with the invention, with the two pieces removed from the box and separated.
Figure 14:
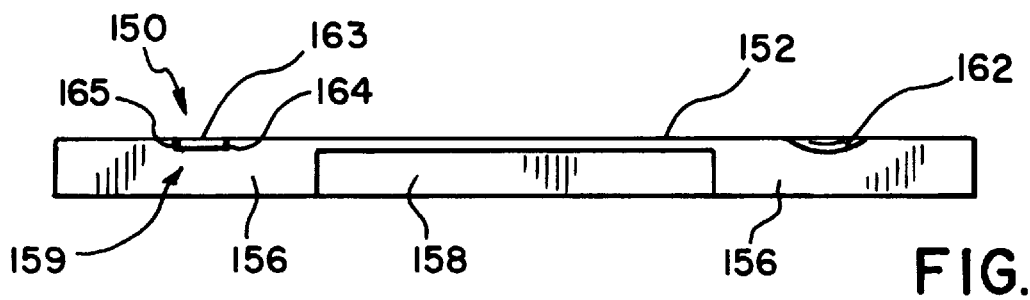
FIG. 14 is a side elevational view of one of the pieces of the wiring tunnel of the invention.
Figure 15:
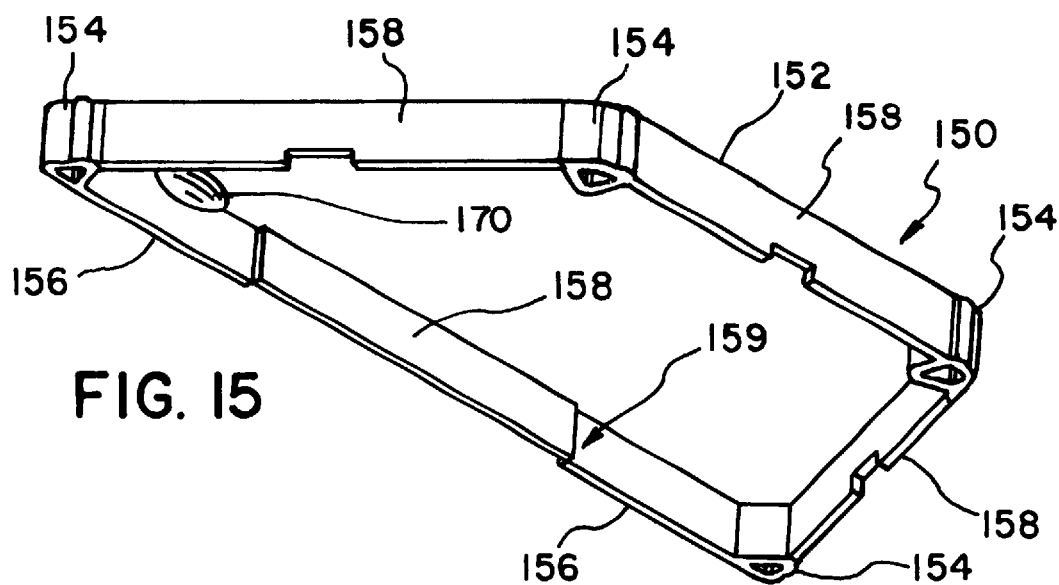
FIG. 15 is a bottom, perspective view of one of the pieces of the wiring tunnel of the invention.

When both tunnel portions 150 are joined as shown in FIG. 12 or 13, the wall segments 156 of each the tunnel portions 150 oppose each other and tunnel portions 150 form the wire tunnel member 18. Wire tunnel member 18 generally forms the shape of a hexagon, and fills the hexagonal cavity 140. The protrusion 164 of one tunnel portion 150 fits smoothly into the depression of the other tunnel portion 150, while maintaining the overall planar surface formed by the upper surfaces of both platforms 152.

As seen in FIG. 12, protrusion 164 is also sized to permit a small, C-shaped gap 166 to form between the edge of the protrusion 164 and the back surface of depression 162. This gap 166 permits a finger of the user to be inserted therein and allows the user to pull one or both of the tunnel portions 150 up away from the bottom 40 of base 12. In effect, by pulling on one of the protrusions 164, the tunnel portions 150 are pivoted away from each other, with the pivot points being the sections of tunnel portions 150 that are opposite to the protrusions and depressions. The two piece nature of tunnel member 18 enables easy removal and replacement of either one or both tunnel portions 150 and permits easy access to the wires or cables already positioned in tunnels 168 or permits easy access to the tunnels 168 in general.

Each tunnel portion 150 is preferably made of plastic material, but could be made from other materials, including metal. Tunnel portions are preferably inserted into base 12 after wiring of the various outlets 16 and compartments has been accomplished.

It should be understood that outlets 16 can be any type of data/communication outlet or device; such as jacks for computers or telephones, or electrical outlets or devices, or other type of outlets needed or desired to be accessed in a junction box. Additionally, tunnels 168 can be used for electrical wires, data/communication wires, or the like.

Once partitions 14, the wires or cable 24, and tunnel member 18 are in place and the outlets 16 are secured to partitions 14, the faceplates 20 can be attached to the partitions 14 as known in the art, with fasteners, such as screws. Since the tunnel member 18 abuts the six sides of the partitions 14 around cavity 140, faceplates 20 protrude over tunnel member 18 toward the center of base 12 when installed on partitions 14 over outlets 16. This positioning of the faceplates 20 acts as a lock on removal of tunnel portions 150 from their joined position. The positioning of the faceplates 20 also prohibits the pulling up of tunnel portions 150 even if gap 166 is employed. Thus, the user can be required to remove the faceplates 20 before accessing wires or cables 24 in tunnels 168. Thus, the locking relationship between faceplates 20 and tunnel member 18 makes box 10 safer for using the box 10 and accessing outlets 16.

The faceplate used can be any type of faceplate typically used to cover outlets 16. The faceplates should be shaped to completely cover the portions of the outlet 16 not intended to be accessed during regular use, and shaped to cover the inner sides 80 of the respective partition 14. Sockets could have openings to mate with the specific adapters. If no adapter is used and a compartment 60 is empty, a blank faceplate 176 can be used.

Once the base 12 is completely assembled, the cover assembly 22 is secured on top of base 12. The cover assembly includes an upper-access, flange cover 180 and a mounting cover 182. A disposable concrete cover (not shown) is used during the pouring of the concrete floor around the box 10. The various parts of the cover assembly 22 can be made from plastic or other material.

The mounting cover 182 has a honeycomb peripheral surface 210 surrounding an access opening 212. The honeycomb surface 210 is attached to flanges 50 by appropriate fasteners. Access opening 212 provides access to the various outlets 16. Concrete cover is sized to be inserted within access opening 212 during the pouring of the concrete floor.

Flange cover 180 has a frame 191, which sits in a portion of access opening 212. A top 190 with handle 192 is pivotally coupled to frame 191 to provide access to the entire access cavity 144. Also, cord ports 194 are pivotally coupled to top 190 to provide a passageway in the form of cord port openings 195 for wires, cables, cords and the like to pass into box 12 when connected to an outlet 16 during use.

While advantageous embodiments have been chosen to illustrate the invention, it will be understood by those skilled in the art from this disclosure that various changes and modifications can be made therein without departing from the scope of the invention as defined in the appended claims.

What is claimed is:

1. An electrical box comprising:
    a base having a support and a perimeter wall, said perimeter wall being coupled to said support and extending away from said support;
    first, second, third, fourth and fifth faceplates;
    first, second, third, fourth and fifth walls; and
    said first, second, third, fourth and fifth walls forming first, second, third, fourth and fifth compartments, each of said first, second, third, fourth and fifth walls being coupled to said perimeter wall and extending from said perimeter wall to at least two of said first, second, third, fourth and fifth faceplates, and each of said compartments being separated from each of the other of said compartments by at least one of said first, second third, fourth and fifth walls.

2. The electrical box according to claim 1, further comprising
    a sixth faceplate; and a sixth wall, said sixth wall along with at least two of said first, second, third, fourth and fifth walls forming a sixth compartment with said sixth faceplate.

3. The electrical box according to claim 1, wherein said perimeter wall is formed by a plurality of access sections having removable knockout portions, and each of said compartment is formed by at least one of said plurality of access sections.

4. The electrical box according to claim 3, wherein each of said plurality of access sections is either substantially parallel to or substantially perpendicular to the other sections of said plurality of sections.

5. The electrical box according to claim 2, wherein each of said first, second, third, fourth, fifth and sixth compartments have an inner side facing the center of said base, with said inner sides forming a central cavity within said base, said central cavity being generally hexagonal in shape.

6. The electrical box according to claim 5, further comprising:

a generally hexagonal-shaped tunnel member positioned on said base in said central cavity, said tunnel member being surrounded by said inner sides of said first, second, third, fourth, fifth, and sixth compartments.

7. The electrical box according to claim 6, wherein each of said inner sides has at least one of said faceplates attached thereto.

8. The electrical box according to claim 1, wherein said base and each of said first, second, third, fourth, and fifth walls are formed from metal.

9. The electrical box according to claim 1, wherein each of said first, second, third, fourth and fifth walls has a means for securely connecting said walls to said support in a removable fashion without separate fasteners.

10. The electrical box according to claim 9, wherein said means for securely connecting includes tabs, which are capable of being inserted into mating slots.

11. An electrical box, comprising:

a base having a support and a perimeter wall coupled to and extending around said support and defining a central cavity; and first and second partitions releasably connected to said base and positioned within said central cavity, said first and second partitions and said perimeter wall forming first and second compartments, said first partition having a first slot and said second partition having a first tab removably positioned within said first slot.

12. The electrical box according to claim 11, further comprising:

third and a fourth partitions connected to said base and positioned within said central cavity, said third and fourth partitions and said perimeter wall forming third and fourth compartments, said second partition has a second slot and said third partition having a second tab removably positioned within said second slot, and said fourth partition having a third slot and said third partition having a third tab removably positioned within said third slot.

13. The electrical box according to claim 12, further comprising:

fifth and a sixth partitions connected to said base and positioned within said central cavity, said fifth and sixth partitions and said perimeter wall forming fifth and sixth compartments, said fourth partition has a fourth slot and said fifth partition having a fourth tab removably positioned within said fourth slot, and said fifth partition having a fifth slot and said sixth partition having a fifth tab removably positioned within said fifth slot.

14. The electrical box according to claim 13, wherein said first partition has a sixth slot and said sixth partition has a sixth tab removably positioned within said sixth slot.

15. The electrical box according to claim 14, wherein said support has at least one support slot, and at least one of said partitions has a support tab removably positioned within said at least one support slot.

16. The electrical box according to claim 15, wherein said first, second, third, fourth, fifth, and sixth compartments define a hexagonal area of said central cavity, and a hexagonal-shaped tunnel member is positioned within said hexagonal area.

17. The electrical box according to claim 16, further comprising:

a cover positioned over said base.

18. An electrical box comprising:

a base having a support and a perimeter wall coupled to and extending away from said support;

first and second compartments formed within said base; and a tunnel member positioned on said support and having first and second tunnel portions, each of said tunnel portions being removably replaceable from said base and having a platform spaced from said support forming a tunnel cavity, at least one of said tunnel cavities forming a first passageway from said first compartment to said second compartment, and said first tunnel portion having a first access element for removal of said first tunnel portion from said base.

19. The electrical box according to claim 18, wherein said tunnel member has a generally hexagonal shape.

20. The electrical box according to claim 18, wherein said second tunnel portion has a second access element, which cooperates with said first access element.

21. The electrical box according to claim 20, wherein said first access element is a first depression and said second access element is a first protrusion shaped similarly to said first depression and capable of being positioned within said first depression.

22. The electrical box according to claim 21, wherein said second tunnel portion has a second depression and said first tunnel portion has a second protrusion, wherein said first and second depressions are substantially identical and said first and second protrusions are substantially identical.

23. The electrical box according to claim 22, wherein each of said tunnel portions has a removable knockout panel.

24. The electrical box according to claim 23, wherein said first tunnel portion is identical to said second tunnel portion.

25. The electrical box according to claim 18, wherein said first and second compartments have first and second inner sides, respectively, first and second faceplates being coupled to said first and second inner sides, respectively, and said tunnel portions are secured to said support by said first and second faceplates.

26. The electrical box according to claim 18, wherein
said first tunnel portion has a first dividing wall and said first passageway and said second tunnel portion has a second dividing wall and a second tunnel passageway, and said first tunnel passageway is separated from said second tunnel passageway by said first and second dividing walls.

27. A method of forming an electrical box, comprising the steps of:

providing a base having a support and a perimeter wall coupled to and extending away from said support;

releasably attaching a first partition to the base;

releasably attaching a second partition to the first partition and to the base, with the first and second partitions forming first and second compartments and each of the first and second partitions being directly coupled to the perimeter wall and the support, and each of the first and second compartments being separated from the other of the first and second compartments by one of the first and second partitions; and placing a cover over the first and second partitions to secure the first and second partitions to the base.

28. The method according to claim 27 wherein
the step of attaching a second partition to the first partition and to the base includes providing a first slot to the first partition and a first tab to the second partition and inserting the first tab into the first slot.

29. The method according to claim 28 further comprising the step of:

attaching third and fourth partitions to the base forming third and fourth compartments, with each of the third and fourth partitions interlocking with another partition.

30. The method according to claim 29 further comprising the step of:

attaching fifth and sixth partitions to the base forming fifth and sixth compartments, with each of the fifth and sixth partitions interlocking with another partition.

31. A method of accessing wires in an electrical box, comprising the steps of:

providing a base having a support and a perimeter wall coupled to and extending away from the support;

providing the base with a tunnel member having first and second tunnel portions, the first tunnel portion being separate from the second tunnel portion, each tunnel portion having a platform spaced from the support forming a tunnel cavity, and the first tunnel portion having an access element for removal of the first tunnel portion;

providing the base with first and second compartments facing the tunnel member, and the tunnel cavity forming a passage way from the first compartment to the second compartment;

providing a faceplate covering each of the first and second compartments;

removing the faceplates;

and removing one of the first and second tunnel portions by hand, without the use of a tool; and accessing the wires.

32. The method according to claim 31, wherein
said step of providing a tunnel member includes providing a hexagonal-shaped tunnel member.

33. The method according to claim 32, wherein
said step of removing one of the first and second tunnel portions by hand, without the use of a tool includes providing the first tunnel member with a first depression and the second tunnel member with a first protrusion, which mates with the first depression.

34. The method according to claim 33, wherein
said step of removing one of the first and second tunnel portions by hand, without the use of a tool includes inserting a human finger into the first depression to contact the first protrusion and lift the second tunnel member away from the support of the base.

35. An electrical floor box, comprising:

a base;

a perimeter wall coupled to said base and defining a central cavity, said perimeter wall substantially enclosing a portion of said base so that said portion of said base traverses a majority of said central cavity;

a first partition coupled to said perimeter wall; and a second partition coupled to said first partition, said first and second partitions forming first and second compartments, and each of said first and second compartments being separated from one another by one of said first and second partitions.

36. An apparatus comprising:

a floor box having a base, a cavity above said base, and at least five compartments disposed around and being accessible through said cavity; and first and second tunnel portions, said first tunnel portion having a first access element for removal from the cavity, and said first and second tunnel portions being supported above said floor box base to form a tunnel between said base and said tunnel portions, and between at least two of said at least five compartments.

\* \* \* \* \*